United States Patent Office  
3,573,302  
Patented Mar. 30, 1971

1

3,573,302  
4,6-BIS-(ALKYNYLAMINO)-s-TRIAZINES  
Albrecht Zschocke, Bad Durkheim, Karl-Heinz Koenig, Ludwigshafen, and Adolf Fischer, Mutterstadt, Germany, assignors to Badische Anilin- & Soda-Fabrik Aktiengesellschaft, Ludwigshafen (Rhine), Germany  
No Drawing. Filed Dec. 2, 1968, Ser. No. 780,562  
Int. Cl. C07d 55/46, 55/20  
U.S. Cl. 260—249.8     3 Claims

ABSTRACT OF THE DISCLOSURE

New and valuable triazine derivatives and a method of controlling the growth of unwanted plant with these compounds, said triazine derivatives having the formula

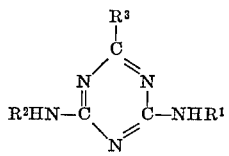

in which $R^1$ denotes an aliphatic or alkoxyalkyl radical having not more than four carbon atoms, $R^2$ denotes the group

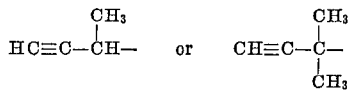

and $R^3$ denotes chlorine or the methoxy or methylmercapto radical or the radical —CN.

---

The present invention relates to new and valuable triazine derivatives and a method of controlling unwanted plant growth with these compounds.

It is known to use triazine derivatives, for example 2-chloro-4,6-bis-(ethylamino)-s-triazine, for weed control. Compatibility with crop plants such as wheat and barley is, however, unsatisfactory.

An object of this invention is to provide new and valuable triazine derivatives. Another object of the invention is to provide in particular new and valuable alkynyl triazine derivatives. A further object of the invention is to provide a method for controlling unwanted plant growth without damage to crop plants.

These and other objects of the invention are achieved by triazine derivatives having the general formula:

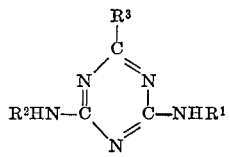

in which $R^1$ denotes an aliphatic or alkoxyalkyl radical having not more than four carbon atoms, $R^2$ denotes the group

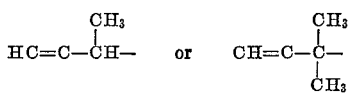

and $R^3$ denotes chlorine or the methoxy or methylmercapto radical or the radical —CN.

The new active ingredients may be prepared for example by reaction of cyanuric chloride in the presence of an agent which binds hydrogen halide with the corresponding alkylamine, alkynylamine or alkoxyalkylamine and, when $R^3$ does not denote chlorine, with an alkali metal methylate or an alkali metal methylmercaptide or an alkali metal cyanide in any sequence.

2

2-chloro-4-ethylamino-6-(butyn-1-yl-3-amino)-s-triazine may be prepared as follows:

At a temperature of —10° to —20° C., 135 parts by weight of ethylamine is dripped into a solution of 276 parts by weight of cyanuric chloride. The mixture is then stirred for another hour at —10° to —20° C. and the precipitate formed is suction filtered. The filtrate is freed from solvent in vacuo at room temperature and the crystalline residue is recrystallized from cyclohexane. 233 parts by weight of 2,4-dichloro-6-ethylamino-s-triazine is obtained having a melting point of from 103° to 105° C.

9.65 parts by weight of 2,4-dichloro-6-ethylamino-2-triazine is dissolved in 50 parts by weight of acetone and at a temperature of from 15° to 20° C. a solution of 7 parts by weight of butyn-1-yl-3-amine in 25 parts by weight of acetone is added. The mixture is stirred for another twenty hours at room temperature (20° C.) and the precipitate formed is suction filtered. The filtrate is freed from solvent in vacuo and the crystalline residue is recrystallized from cyclohexane. 10.5 parts by weight of 2-chloro-4-ethylamino-6-(butyn-1-yl-3-amino)-s-triazine is obtained having a melting point of 140° C. 2-methylmercapto-4-ethylamino-6-(butyn-1-yl-3-amino)-s-triazine may be prepared as follows:

184 parts by weight of cyanuric chloride is dissolved in 3000 parts by weight of ethyl acetate and at a temperature of from —10° to —20° C. a solution of 48 parts by weight of methyl mercaptan and a solution of 40 parts by weight of sodium hydroxide dissolved in 360 parts of water are added at the same time from two dropping funnels. The mixture is stirred for another two hours at a temperature of —10° C., the organic layer is separated, dried with magnesium sulfate and the solvent is removed in vacuo at a temperature of up to 35° C. The crystalline residue is recrystallized from petroleum ether. 110 parts by weight of 2-methylmercapto-4,6-dichloro-s-triazine is obtained having a melting point of from 58° to 60° C.

9.8 parts by weight of 2-methylmercapto-4,6-dichloro-s-triazine is suspended in 25 parts by weight of water and 15 parts by weight of acetone and then 5.25 parts by weight of butyn-1-yl-3-amine hydrochloride dissolved in 10 parts by weight of water is added. A solution of 4 parts of sodium hydroxide in 15 parts by weight of water is subsequently dripped into the mixture at a temperature of from 25° to 40° C. The reaction mixture is stirred for some hours at 35° C., the oil which has separated is shaken with methylene chloride, the methylene chloride solution is dried with magnesium sulfate and the solvent is removed in vacuo. The oily residue is ground with petroleum ether and becomes solid. 9 parts by weight of 2-methylmercapto-4-chloro-6-(butyn-1-yl-3-amino)-s-triazine is obtained having a melting point of from 56° to 58° C.

5.7 parts by weight of 2-methylmercapto-4-chloro-6-(butyn-1-yl-3-amino)-s-triazine is suspended in 25 parts by weight of water, 10 parts by weight of acetone and 3.5 parts by weight of 35% aqueous ethylamine, the mixture is boiled under reflux and at this temperature a solution of 1 part by weight of sodium hydroxide in 5 parts by weight of water is dripped in.

The mixture is then stirred for three hours at boiling temperature, cooled to room temperature and the oil which separates is shaken with methylene chloride, the organic layer is dried and the solvent is removed in vacuo. The oily residue becomes crystalline when toluene is added, and the whole is cooled. 4.8 parts by weight of 2-methylmercapto-4-ethylamino-6-(butyn-1-yl-3-amino)-s-triazine is obtained having a melting point of 95° to 97° C. Examples of the new ingredients are as follows:

2-chloro-4-ethylamino-6-(3-methylbutyn-1-yl-3-amino)-s-triazine; melting point 135° to 137° C., 2-chloro-4-isopropylamino-6-(3-methylbutyn-1-yl-3-
  amino)-s-triazine; melting point 146° to 148° C.,
2-methylmercapto-4-ethylamino-6-(butyn-1-yl-3-
  amino)-s-triazine; melting point 95° to 97° C.,
2-chloro-4-isopropylamino-6-(butyn-1-yl-3-amino)-
  s-triazine; melting point 170° C.,
2-chloro-4-ethylamino-6-(butyn-1-yl-3-amino)-s-
  triazine; melting point 140° C.,
2-chloro-4,6-bis-(butyn-1-yl-3-amino)-s-triazine; melting point 161° C.

Other compounds are mentioned in the examples. Herbicides may be prepared in a conventional manner from the compounds according to this invention by mixing the compounds with solid or liquid carriers, for example water, hydrocarbons, organic solvents, clay, fertilizers, borax or diatomaceous earth. It is also possible to add wetting agents, dispersing agents, adhesives and fungicides, insecticides or other herbicidally active compounds. The herbicides may also be applied in granular form.

The following examples illustrate the superiority of the compounds according to this invention over known active ingredients.

EXAMPLE 1

Plastics pots having a diameter of 8 cm. are filled with loamy sandy soil in a greenhouse and sown with seeds of barley (*Hordeum vulgare*), wheat (*Triticum sativum*), Indian corn (*Zea mays*), annual meadow grass (*Poa annua*), slender foxtail (*Alopecurus myosuroides*), small nettle (*Urtica urens*), wild mustard (*Sinapis arvensis*), white goosefoot (*Chenapodium album*), vetch (*Vicia sp.*), chamomile (*Matricaria chamomilla*) and chickweed (*Stellaria media*) and then treated with 1.5 kg. per hectare of 2-chloro - 4 - ethylamino - 6 - (butyn - 1 - yl-3-amino)- s-triazine (I) and, for comparison, with 1.5 kg. per hectare of 2-chlor-4,6-bis-(ethylamino)-s-triazine (II), these amounts of the active ingredients each being dispersed in 500 liters of water. After four to five weeks (I) exhibits a better plant compatibility with barley (*Hordeum vulgare*) and wheat (*Triticum sativum*) and at the same time a stronger herbicidal action on the weeds.

The results may be seen from the following table:

|  | (I) | (II) |
| --- | --- | --- |
| Active ingredient: |  |  |
| Barley | 10-20 | 20-30 |
| Wheat | 10 | 20-30 |
| Indian corn | 0-10 | 0-10 |
| Annual meadow grass | 90 | 80 |
| Slender foxtail | 80 | 70 |
| Small nettle | 100 | 90-100 |
| Wild mustard | 100 | 90 |
| White goosefoot | 90-100 | 80-90 |
| Vetch | 90-100 | 80 |
| Chamomile | 90 | 80-90 |
| Chickweed | 90-100 | 80-90 |

NOTE: 0=No damage; 100=Total destruction.

The following substances have the same biological effect as the substance (I) in any of Examples 1 to 4:

2-chloro-4-isopropylamino-6-(butyn-1-yl-3-amino)-
  s-triazine,
2-chloro-4-tertiary-butylamino-6-(butyn-1-yl-3-amino)-
  s-triazine,
2-chloro-4-(3-methoxypropyl)-amino-6-(butyn-1-yl-3-
  amino)-s-triazine,
2-chloro-4-ethylamino-6-(3-methylbutyn-1-yl-3-amino)-
  s-triazine,
2-chloro-4,6-bis-(butyn-1-yl-3-amino)-s-triazine,
2-methylmercapto-4-isopropylamino-6-(butyn-1-yl-3-
  amino)-s-triazine,
2-methylmercapto-4-ethylamino-6-(3-methylbutyn-1-
  yl-3-amino)-s-triazine,
2-methylmercapto-4-(3-methoxypropyl)-amino-6-
  (butyn-1-yl-3-amino)-s-triazine,
2-methylmercapto-4-ethylamino-6-(butyn-1-yl-3-
  amino)-s-triazine,
2-methoxy-4-ethylamino-6-(butyn-1-yl-3-amino)-
  s-triazine,
2-methoxy-4-isopropylamino-6-(butyn-1-yl-3-amino)-
  s-triazine,
2-methoxy-4-ethylamino-6-(3-methylbutyn-1-yl-3-
  amino)-s-triazine,
2-cyano-4-ethylamino-6-(butyn-1-yl-3-amino)-
  s-triazine,
2-chloro-4-isopropylamino-6-(3-methylbutyn-1-yl-3-
  amino)-s-triazine,
2-chloro-4-methylamino-6-(butyn-1-yl-3-amino)-
  s-triazine, and
2-methylmercapto-4-methylamino-6-(butyn-1-yl-3-
  amino)-s-triazine.

EXAMPLE 2

In a greenhouse, the plants barley (*Hordeum vulgare*), wheat (*Triticum sativum*), Indian corn (*Zea mays*), annual meadow grass (*Poa annua*), slender foxtail (*Alopecus myosuroides*), barnyard grass (*Panicum crus-galli*), wild mustard (*Sinapis arvensis*), white goosefoot (*Chenopodium album*), small nettle (*Urtica urens*), chickweed (*Stellaria media*) and chamomile (*Matricaria chamomilla*) are treated at a growth height of 3 to 18 cm. with 1.5 kg. per hectare of 2-chloro - 4 - ethylamino-6- (butyn-1-yl-3-amino)-s-triazine (I) and, for comparison, with 1.5 kg. per hectare of 2-chloro-4,6-bis-(ethylamino)- s-triazine (II), these amounts of the active ingredients each being dispersed in 500 liters of water.

After three weeks it is found that active ingredient (I) has a better selectivity on barley (*Hordeum vulgare*) and wheat (*Triticum sativum*) than (II) and a stronger herbicidal action on the weeds.

The herbicidals action may be seen from the following table:

|  | (I) | (II) |
| --- | --- | --- |
| Active ingredient: |  |  |
| Barley | 0-10 | 20-30 |
| Wheat | 10 | 20-30 |
| Indian corn | 0-10 | 0-10 |
| Annual meadow grass | 90-100 | 90 |
| Slender foxtail | 90 | 80 |
| Barnyard grass | 80 | 50-60 |
| Wild mustard | 100 | 90-100 |
| White goosefoot | 100 | 90-100 |
| Small nettle | 90-100 | 90-100 |
| Chickweed | 90-100 | 90 |
| Chamomile | 90-100 | 80-90 |

NOTE: 0=No damage; 100=Total destruction.

EXAMPLE 3

In a greenhouse, seeds of annual meadow grass (*Poa annua*), slender foxtail (*Alopecurus myosuroides*), small nettle (*Urtica urens*), wild mustard (*Sinapis arvensis*), white goosefoot (*Chenopodium album*), betch (*Vicia sp.*), chamomile (*Matricaria chamomilla*) and chickweed (*Stellaria media*) are planted in loamy sandy soil and which is then treated with 5 kg. per hectare of 2-chloro-4 - ethylamino-6-(butyn-1-yl-3-amino)-s-triazine (I) and for comparison, with 5 kg. per hectare of 2-chloro-4,6-bis-(ethylamino)-s-triazine (II) these amounts of the active ingredients each being dispersed in 500 liters of water per hectare.

After four to five weeks it is found that (I) has a somewhat better herbicidal action than (II).

EXAMPLE 4

An experimental area having a crop of annual meadow grass (*Poa annua*) slender foxtail (*Alopecurus myosuoides*), barnyard grass (*Panzicum crus-galli*), wild mustard (*Sinapis arvensis*), white goosefoot (*Chenopodium album*), small nettle (*Urtica urens*), chickweed (*Stellaria*

*media*) and chamomile (*Matricaria chamomilla*) is treated at a growth height of the plants of 3 to 12 cm. with 5 kg. per hectare of 2 - chloro-4-ethylamino-6-(butyn-1-yl-3-amino)-s-triazine (I) and, for comparison with 5 kg. per hectare of 2-chloro-4,6-bis-(ethylamino)-s-triazine (II), these amounts of the active ingredients each being dispersed in 500 liters of water per hectare. After one to two weeks is found that herbicidal action has occurred more rapidly in the case of the abovementioned weeds and weed grasses with (I) than with (II) and after four to eight weeks all the plants are almost completely withered.

We claim:
1. A triazine derivative having the formula:

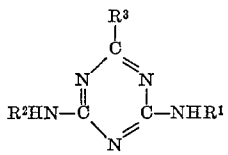

in which $R^1$ denotes a member selected from the group consisting of lower alkyl, lower alkoxyalkyl, and butynyl, $R^2$ denotes the group

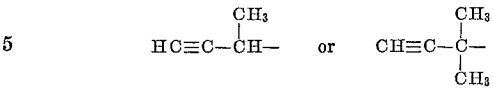

and $R^3$ denotes chlorine, the methoxy radical, the methylmercapto radical or the radical —CN.

2. 3 - chloro - 4 - ethylamino-6-(butyn-1-yl-3-amino)-s-triazine.

3. 2-chloro-4-isopropylamino-6-(butyn-1-yl-3-amino)-s-triazine.

References Cited

UNITED STATES PATENTS 2,909,420   10/1959   Gysin et al. _____ 260—249.8

JOHN M. FORD, Primary Examiner

U.S. Cl. X.R.

71—93; 260—249.9

PO-1050
(5/69)

UNITED STATES PATENT OFFICE
CERTIFICATE OF CORRECTION

Patent No. 3,573,302        Dated March 30, 1971

Inventor(s) Albrecht Zschocke et al

It is certified that error appears in the above-identified patent and that said Letters Patent are hereby corrected as shown below:

Column 1, line 8, insert -- Claims priority, application Germany, December 6, 1967, P 16 70 291.3 -- .

Column 1, line 62, "
$$\begin{array}{c} CH_3 \\ | \\ HC{=}C{-}CH{-} \end{array}$$
" should read --
$$\begin{array}{c} CH_3 \\ | \\ HC{\equiv}C{-}CH{-} \end{array}$$
-- .

Column 1, line 62, "
$$\begin{array}{c} CH_3 \\ | \\ CH{=}C{-}C{-} \\ | \\ CH_3 \end{array}$$
" should read --
$$\begin{array}{c} CH_3 \\ | \\ CH{\equiv}C{-}C{-} \\ | \\ CH_3 \end{array}$$
--

Column 3, line 46, delete "Active ingredient".

Column 4, line 40, "Active ingredient:" should be on line 38.

Column 4, line 73, "Panzicum" should read -- Panicum --.

Signed and sealed this 30th day of November 1971.

(SEAL)
Attest:

EDWARD M. FLETCHER, JR.
Attesting Officer

ROBERT GOTTSCHALK
Acting Commissioner of Patents